United States Patent

Köhler et al.

[11] Patent Number: 5,132,331
[45] Date of Patent: Jul. 21, 1992

[54] POLYCARBONATE FOAMS

[75] Inventors: Burkhart Köhler, Krefeld; Klaus Kircher, Leverkusen; Ulrich Grigo, Kempen; Klaus Horn, Krefeld; Wolfgang Ebert, Krefeld; Charles-Earl Lundy, Krefeld, all of Fed. Rep. of Germany

[73] Assignees: Bayer Aktiengesellschaft, Leverkusen, Fed. Rep. of Germany; Miles Inc., Pittsburgh, Pa.

[21] Appl. No.: 815,302

[22] Filed: Dec. 27, 1991

[30] Foreign Application Priority Data

Jan. 4, 1991 [DE] Fed. Rep. of Germany ....... 4100118

[51] Int. Cl.$^5$ .............................................. C08J 9/12
[52] U.S. Cl. ...................... 521/85; 521/89; 521/92; 521/125; 521/126; 521/180
[58] Field of Search ............ 521/89, 92, 125, 126, 521/180

[56] References Cited

U.S. PATENT DOCUMENTS

| | | | |
|---|---|---|---|
| 3,277,029 | 10/1966 | Chadwick | 521/180 |
| 3,290,261 | 12/1966 | Goldblum | 521/180 |
| 4,544,677 | 10/1985 | Allen et al. | 521/180 |
| 4,556,681 | 12/1985 | Liberti | 521/180 |
| 4,904,702 | 2/1990 | Allen | 521/180 |
| 5,006,567 | 4/1991 | Fazio | 521/180 |

FOREIGN PATENT DOCUMENTS

| | | |
|---|---|---|
| 1031507 | 6/1958 | Fed. Rep. of Germany . |
| 841652 | 7/1960 | United Kingdom . |
| 1479292 | 7/1977 | United Kingdom . |

OTHER PUBLICATIONS

Plastics Technology 10, 1964, pp. 32 to 36.

*Primary Examiner*—Morton Foelak
*Attorney, Agent, or Firm*—Joseph C. Gil; Aron Preis

[57] ABSTRACT

A foamable thermoplastic molding composition comprising:
a) an aromatic polycarbonate, and
b) 0.1 to 5% by weight of a hydrate of an inorganic salt, is disclosed. The salt is inert to the polycarbonate and is capable of releasing its water of hydration only at a temperature above 100° C.

The composition which may optionally further contain c) up to 10% by weight of a nucleating agent, and d) up to 30% by weight of glass fibers is characterized by its good pore structure.

8 Claims, No Drawings

POLYCARBONATE FOAMS

FIELD OF THE INVENTION

The invention relates to thermoplastic polycarbonate resins and more particularly to foams made from such resins.

SUMMARY OF THE INVENTION

The present invention relates to foamable thermoplastic compositions comprising
a) an aromatic polycarbonate, and
b) 0.1 to 5% by weight of a hydrate of an inorganic salt.

The composition of the invention may optionally further contain c) up to 10% by weight of a nucleating agent, and d) up to 30% by weight of glass fibers. The percent by weight being relative to the weight of said polycarbonate.

BACKGROUND OF THE INVENTION

Foams of aromatic polycarbonates and processes for their production are known. For example, aromatic polycarbonates can be foamed with blowing agents which give off nitrogen or carbon dioxide - decomposition blowing agents (cf. DE-AS 1,031,507 and DE-OS 2,434,085). A distinct reduction in molecular weight is generally observed. The non-volatile decomposition products of the blowing agent remain in the foams.

It is also known that aromatic polycarbonates can only be satisfactorily processed if they are completely dry. Any moisture present leads during processing to a reduction in molecular weight and to the formation of bubbles (cf. Plastics Technology 10, 1964, pages 32 to 36; GB-PS 841, 652).

DETAILED DESCRIPTION OF THE INVENTION

The present invention is based on the observation that water can be used as a physical evaporation blowing agent for the production of foams having a good pore structure from aromatic polycarbonates providing it is introduced in the form of a hydrated, inorganic salt which is inert to aromatic polycarbonate and which only releases its water of hydration at temperatures above 100° C.

Polycarbonates foamed with water as blowing agent contain no residues of the blowing agent because the water evaporates completely during the foaming reaction. Since only a surprisingly small reduction in molecular weight is observed in this method of foaming, so that the polymer is virtually undamaged, the foams obtained can be recycled. They can be remelted with virtually no losses and reused for the production of the foamable mixtures.

The present invention relates to foamable mixtures containing
a) an aromatic polycarbonate,
b) 0.1 to 5% by weight, based on a), of a hydrate of an inorganic salt,
c) optionally up to 10% by weight, based on a), of a nucleating agent,
d) optionally up to 30% by weight, based on a), glass fibers.

Aromatic polycarbonates a) are thermoplastics which have been produced from diphenols and carbonate donors by standard methods which have often been described in the literature (see for example, H. Schnell, Chemistry and Physics of Polycarbonates, Interscience Publishers, New York, 1964; U.S. Pat. No. 3,028,365 and DE-OS 3,832,396.

Suitable diphenols are, for example, hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxphenyl)-sulfones, bis-(hydroxyphenyl)-sulfoxides, $\alpha,\alpha'$-bis-(hydroxyphenyl)-diisopropylbenzenes and also nucleus-alkylated and nucleus-halogenated derivatives thereof.

Preferred diphenols are 4,4'-dihydroxydiphenyl, 2,2-bis-4-hydroxyphenyl)-propane, 2',4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, (3,5-dimethyl-4-hydroxyphenyl)methane, bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-3,5-dichloro-4-hydroxyphenyl)-propane, 2,2-bis-(3,5-dibromo-4-hydroxyphenyl)-propane and 1,1-bis-(4-hydroxyphenyl)-3,3,5trimethyl cyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl), 3,3,5-trimethyl cyclohexane.

The diphenols may be used individually or in admixture, i.e. both homopolycarbonates and copolycarbonates are included. The diphenols are known or may be produced by known methods.

Small quantities, preferably quantities of 0.05 to 2.0 mol-%, based on mols diphenols used, of trifunctional or more than trifunctional compounds, particularly those containing three or more than three phenolic hydroxyl groups, may be used to produce branched polycarbonates. Examples of such compounds are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(3,4-dihydroxyphenyl)-propane, hexa-(4-(4-hydroxyphenylisopropyl)-phenyl)-orthoterephthalic acid ester, tetra-(4.hydroxyphenyl)-methane, tetra-(4-(4-hydroxyphenyl-isopropyl)-phenoxy)-methane, 1,4-bis-(4',4''-dihydroxytriphenyl)-methylbenzene, 2,4-dihydroxybenzoic acid, trimesic acid, cyanuric chloride and 3,3-bis-(3-methyl-4-hydroxyphenyl)-2-oxo-2,3-dihydroindole.

The branching agents may be initially introduced either with the diphenols themselves or with the molecular weight regulators in the aqueous alkaline phase or may be added in solution in an organic solvent before the phosgenation reaction.

Suitable molecular weight regulators are the known monofunctional compounds, preferably monophenols, for example phenol itself.

The aromatic polycarbonates used in accordance with the invention have average molecular weights Mw (weight average, as determined by gel permeation chromatography) in the range from 5,000 to 50,000 and preferably in the range from 15,000 to 35,000.

Accordingly, the solution viscosities of the preferred polycarbonates are in the range from 1.15 to 1.35, as measured in dichloromethane (0.5 9/100 ml) according to DIN 51.562, part 3.

Thermoplastic aromatic polycarbonates in the context of the present invention include thermoplastic aromatic polyester carbonates, i.e. "polycarbonates" in which part (at most 50 mol-%) of the carbonate structural units are replaced in known manner by aromatic dicarboxylate structural units.

Suitable aromatic dicarboxylic acids are, for example, orthophthalic acid, terephthalic acid, isophthalic acid, tert. butyl isophthalic acid, 3,3'-diphenyl dicarboxylic acid, 4,4'-diphenyl dicarboxylic acid, 4,4'-diphenyl ether dicarboxylic acid, 4,4'-benzophenone dicarboxylic acid, 3,4'-benzophenone dicarboxylic acid, 4,4'-diphenyl sulfone dicarboxylic acid, 2,2-bis-(4-carboxyphenyl)-propane, trimethyl-3-phenylindane.4,5'-dicarboxylic acid.

Among the aromatic dicarboxylic acids, terephthalic acid and/or isophthalic acid are particularly preferred.

Suitable diphenols are those mentioned above for the production of the polycarbonates.

The same applies to the branching agents and to the monophenolic chain terminators, although aromatic monocarboxylic acids, for example in the form of their acid chlorides or esters, may also be used for this purpose.

The carbonic acid may be incorporated in the polyester carbonates either via $COCl_2$ or via diphenyl carbonate, depending on the production process selected, 1.e. depending on whether interfacial polycondensation or melt transesterification is used for the production of the polyester carbonates.

The same applies to the aromatic dicarboxylic acids. They are used either as aromatic dicarboxylic acid dichlorides in the interfacial process or as dicarboxylic acid diesters in the melt transesterification process. The same applies where monocarboxylic acids are used as chain terminators.

The polyester carbonates to be used in accordance with the invention are produced by known methods, i.e. for example by the interfacial method or by the melt transesterification method, as already mentioned.

Accordingly, the polyester carbonates to be used may be both linear and branched in known manner.

The aromatic polyester carbonates used in accordance with the invention have average molecular weights Mw (weight average, as determined by gel permeation chromatography) in the range from 5,000 to 50,000 and preferably in the range from 15,000 to 35,000.

Suitable hydrated inorganic salts b) are, in particular, the hydrates of salts of metals of the 2nd and 3rd main group of the periodic system with mineral acids. The salts in question are, for example, sulfates, sulfites, halides (chlorides) nitrates, nitrites, phosphates, phosphites of magnesium, calcium, strontium and aluminum. Magnesium sulfate heptahydrate, magnesium chloride hexahydrate, zinc sulfate heptahydrate, $Al_2(SO_4)_3 \cdot 18 H_2O$ and calcium sulfate dihydrate are particularly preferred. In selecting the hydrate salts, it is important to ensure that they only release their water of hydration at temperatures above 100° C. and that the salts themselves do not attack the polycarbonate. Accordingly, salts showing an alkaline reaction, i.e. salts of strong bases with weak acids, are not included because they attack the polycarbonate at relatively high temperatures.

The quantity in which the hydrate salts are used must be gauged in such a way that approximately 0.05 to 1% by weight water, based on the polycarbonate, is available for foaming. In general, therefore, quantities of 0.1 to about 5% by weight hydrate salts are preferred. This figure applies in particular to the preferred hydrate salts mentioned above. The quantity of water or hydrate salt is of course also dependent upon the density of the foam to be produced.

Suitable nucleating agents, which may be added to facilitate foam formation, are neutral to mildly acidic fillers, such as glass powder, quartz sand, finely disperse silica and also glass fibers. Nucleating agents are generally used in quantities of up to 10% by weight, based on polycarbonate. In addition, glass fibers may also be used in relatively large quantities of up to about 30% by weight. Glass fibers in the present context are, in particular, milled fibers.

To produce the foamable mixtures according to the invention, the constituents may be mechanically mixed in any order. The temperature must not exceed 100° C. in order to avoid premature release and evaporation of the water. Methods for intensively and homogeneously mixing solid constituents of the type in question are known to the expert.

The mixture is stable at temperatures of up to about 100° C., so that they may be prepared at any time and are indefinitely storable.

To form the foam from the mixture according to the invention, the mixture may be processed by any of the methods normally used for thermoplastics. Accordingly, the mixture may be processed by injection molding or by extrusion, preferably using machines which enable a melt pressure of at least 30 bar up to the nozzle of the injection molding machine or the extrusion die. Where the mixture is processed by injection molding, temperatures of 240° to 340° C. and preferably 260° to 320° C. are suitable. Temperatures of 210° to 340° C. and preferably 220° to 270° C. have been successfully used for extrusion. Moldings of any type, more particularly articles of large surface area and large volume, for example lamp components, covers, housings for office machines, cabinet elements, may thus be produced from the foamable mixtures according to the invention. One particular application is for panels of large surface area for advertising purposes, in vehicle construction and in building construction because the recycling of used parts is important in such applications.

The melting of a foam molding ultimately gives a mixture of polycarbonate and, where present, nucleating agent or glass. This mixture may be reused for the production of the mixture according to the invention. In other words, the polycarbonate is completely recyclable.

The invention is further illustrated but is not intended to be limited by the following examples in which all parts and percentages are by weight unless otherwise specified.

EXAMPLE 1 (Invention)

94.5% by weight of a mixture of non-predried polycarbonate having a relative solution viscosity according to DIN 51 562, Part 3, of 1.290 were mixed in a tumble mixer with 0.3% by weight Syloid 74 (finely disperse silica) and 0.25% by weight finely ground MgSO$_4$.7H$_2$O and the resulting mixture was processed as follows to moldings having a density of 0.7 g/cm$^3$:

The granular mixture was injection-molded in a Demag D 80 injection-molding machine (cylinder temperatures 260° C. (feed), 280° C. and 300° C.; nozzle temperature 300° C. corresponding to a melt temperature of 300° C.) to foamed moldings measuring 150 mm ×90 mm×6.4 mm. The mold temperature was 23° C. Moldings having an integral density distribution were obtained for a shot weight of 60.5 g.

The foam obtained had very fine cells and contained no relatively large bubbles.

The relative solution viscosity according to DIN 51 562, Part 3, measured 1.275. The Charpy impact strength according to DIN 53 453 measured 56 kJ/m$^2$.

EXAMPLE 2 (Invention)

99.5% by weight additive-free polycarbonate having a relative solution viscosity according to DIN 51 562, Part 3, of 1.31 was mixed in a tumble mixer with 0.5% by weight finely ground MgSO$_4$.7H$_2$O without preliminary drying and the resulting mixture was extruded in a Reiffenhauser extruder (cylinder diameter 70 mm, melt temperature 230° C. at the nozzle gap, 350 mm×2 mm flat nozzle) to form an elongate molding which was smoothed in low-friction calibrators with a plate interval of 5 mm and taken off by means of a caterpillar take-off unit.

The extruded foam obtained had a density of 0.7 g/cm$^3$ and contained uniformly distributed, small bubbles which distinctly decreased in number and size in the edge zones at a distance of 0.5 mm from the surface of the molding.

The relative solution viscosity of the polycarbonate in the molding was 1.302.

EXAMPLE 3 (Invention)

The procedure was as in Example 2, except that 99.2% by weight polycarbonate, 0.5% by weight finely ground MgSO$^4$.7H$_2$O and, in addition, 0.3% by weight Syloid 74 (finely disperse silica) were used and a density of 0.5 g/cm$^3$ was adjusted.

A very good foam with compact edge zones and small bubbles in the middle of the molding was obtained.

The relative solution viscosity of the polycarbonate in the molding was 1.30.

EXAMPLE 4 (Invention)

The procedure was as in Example 2, except that 97.5% by weight polycarbonate having a relative solution viscosity of 1.31 was mixed in a tumble mixer with 0.5% by weight finely round MgSO$_4$.7H$_2$O and 2% by weight ground chopped strands (MF 7901, a product of Bayer AG) under otherwise the same conditions and the resulting mixture subsequently extruded. The extruded foam (density 0.50 g/cm$^3$) had a relative solution viscosity of 1.30 and a foam structure comparable with that in Example 3.

EXAMPLE 5 (Invention)

Example 2 was repeated, except that 97.2% by weight polycarbonate (relative solution viscosity 1.31) and 2.8% by weight of a mixture consisting of a) MgSO$_4$.7H$_2$O, finely ground, MF 7901 chopped strands and Syloid 74 finely disperse silica were introduced into the feed hopper of the extruder via Colortronic metering and mixing units in such quantities that the final mixture contained 0.5% by weight MgSO$_4$.7H$_2$O, 2% by weight MF 7901 and 0.3% by weight Syloid 74.

The resulting foam (density 0.50 g/cm$^3$, had particularly fine cells and was uniform. The structure of the foam was distinctly better than in Examples 3 and 4.

EXAMPLE 6

The procedure was as in Example 4, except that 97.4% by weight polycarbonate having a relative solution viscosity of 1.31 was mixed in a tumble dryer with 0.6% by weight finely ground ZnSO$_4$.7H$_2$O and 2% by weight ground chopped strands (MF 7901, a product of Bayer AG) under otherwise the same conditions and the resulting mixture subsequently extruded. The extruded foam (density 0.6 g/cm$^3$) had a relative solution viscosity of 1.301 and a foam structure comparable with that in Example 3.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A foamable thermoplastic molding composition comprising
   a) an aromatic polycarbonate,
   b) 0.1 to 5 percent of a hydrate of an inorganic metal salt wherein metal is a member selected from the group consisting of the 2nd and 3rd main groups of the periodic system and wherein salt is selected from the group consisting of sulfates, sulfites, halides, nitrites, phosphates and phosphites, said salt being characterized in that it is inert to said polycarbonate and in that it is capable of releasing its water of hydration only at a temperature above 100° C., said percent being relative to the weight of said polycarbonate.

2. The composition of claim 1 further containing up to 10 percent of a nucleating agent.

3. The composition of claim 1 further containing up to 30 percent glass fibers.

4. A process for the production of the molding composition of claim 1 comprising subjecting said polycarbonate and said hydrate to intensive physical mixing at a temperature below 100° C.

5. An article molded from the composition of claim 1.

6. The composition of claim 1 wherein said metal is a member selected from the group consisting of magnesium, calcium, zinc, strontium and aluminum.

7. The composition of claim 1 wherein said hydrate is at least one member selected from the group consisting of magnesium sulfate heptahydrate, magnesium chloride hexahydrate, zinc sulfate heptahydrate, Al$_2$(SO$_4$)$_3$.18H$_2$O and calcium sulfate dihydrate.

8. An article molded from the composition of claim 7.